Jan. 21, 1958  M. P. SMITH  2,820,644
ENGINE TRAILER STEERING MEANS
Filed July 16, 1954  6 Sheets-Sheet 1
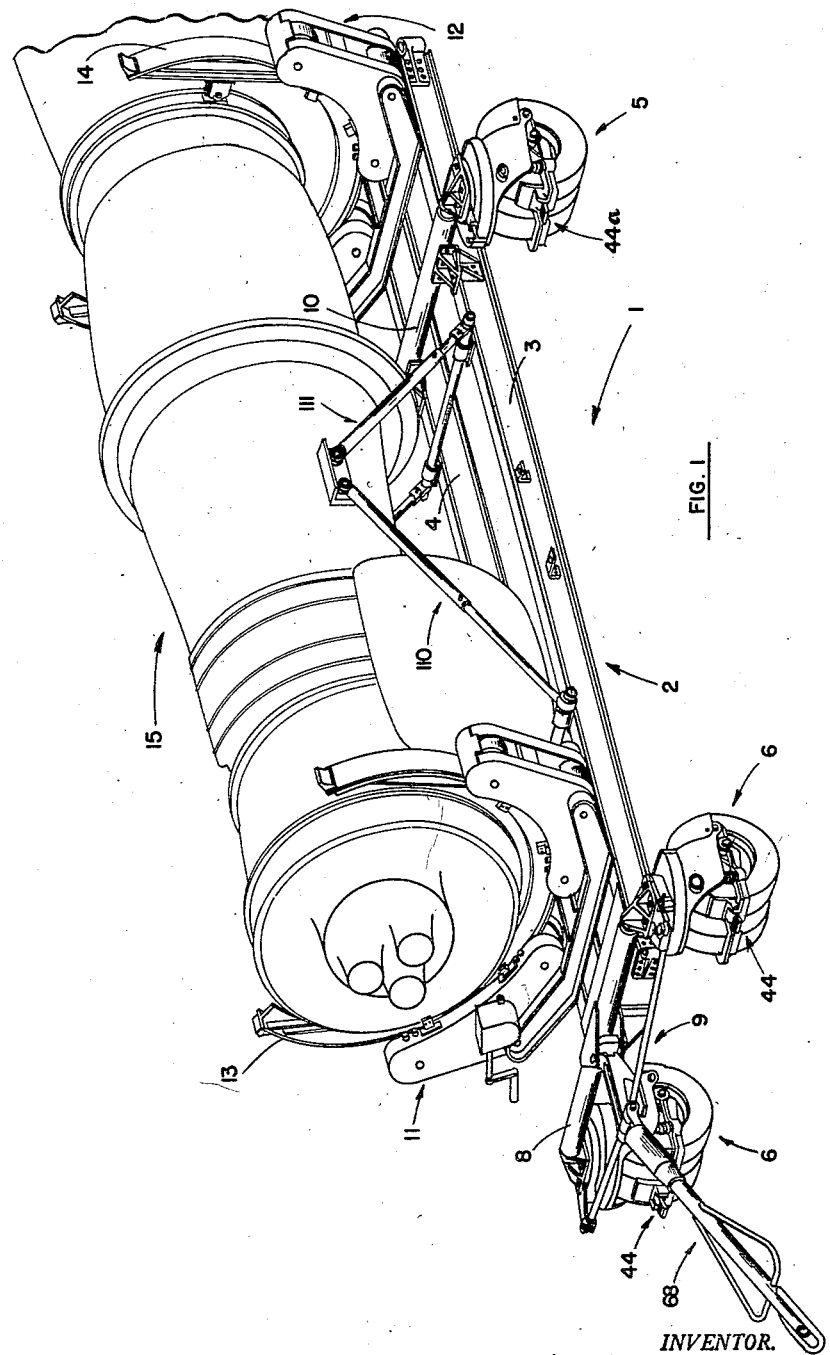
INVENTOR.
MORTIMER P. SMITH
BY
William L. Lane
ATTORNEY

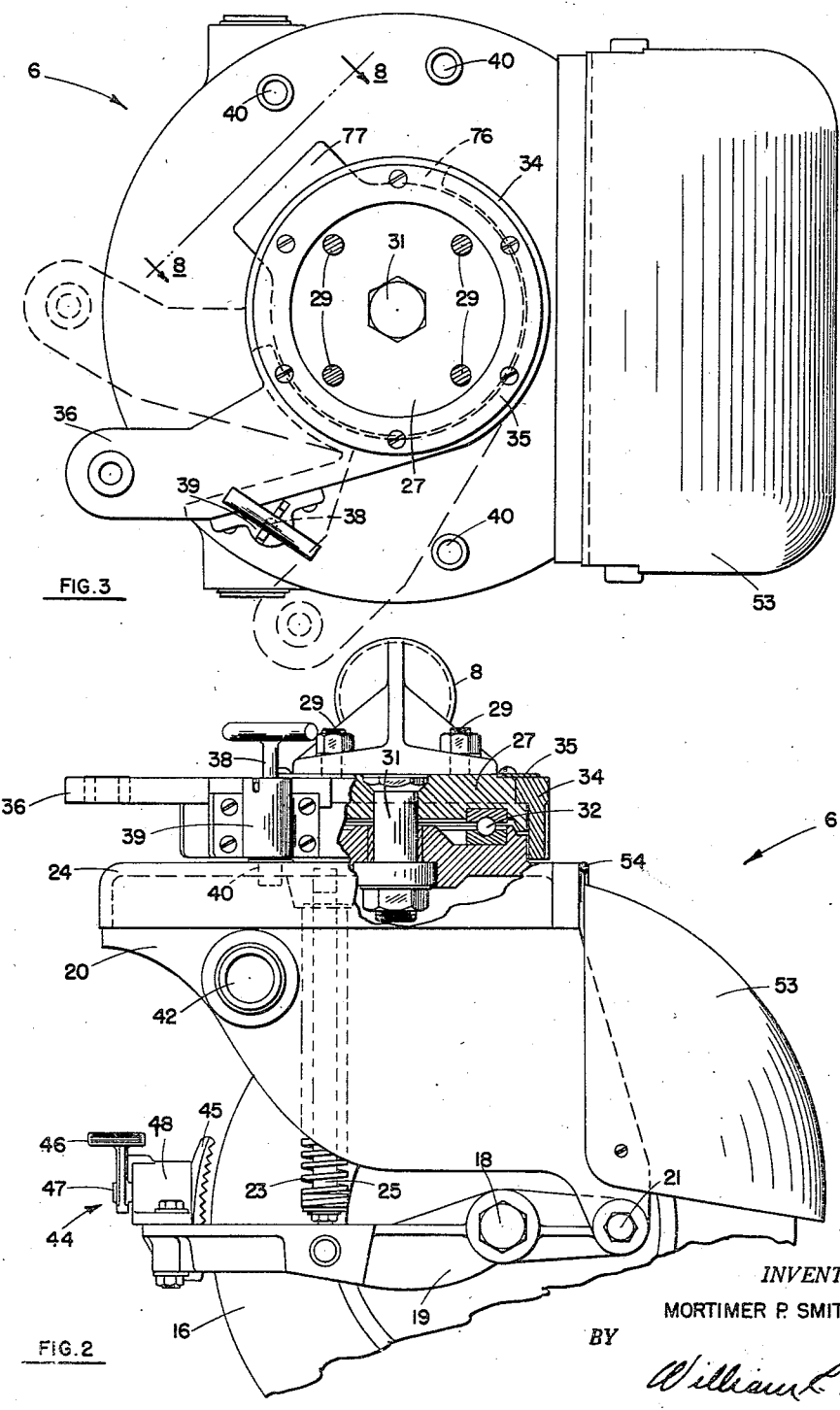

Jan. 21, 1958  M. P. SMITH  2,820,644
ENGINE TRAILER STEERING MEANS
Filed July 16, 1954  6 Sheets-Sheet 3

INVENTOR.
MORTIMER P. SMITH
BY
William R. Lane
ATTORNEY

Jan. 21, 1958 M. P. SMITH 2,820,644
ENGINE TRAILER STEERING MEANS
Filed July 16, 1954 6 Sheets-Sheet 4

INVENTOR.
MORTIMER P. SMITH
BY
William R. Lane
ATTORNEY

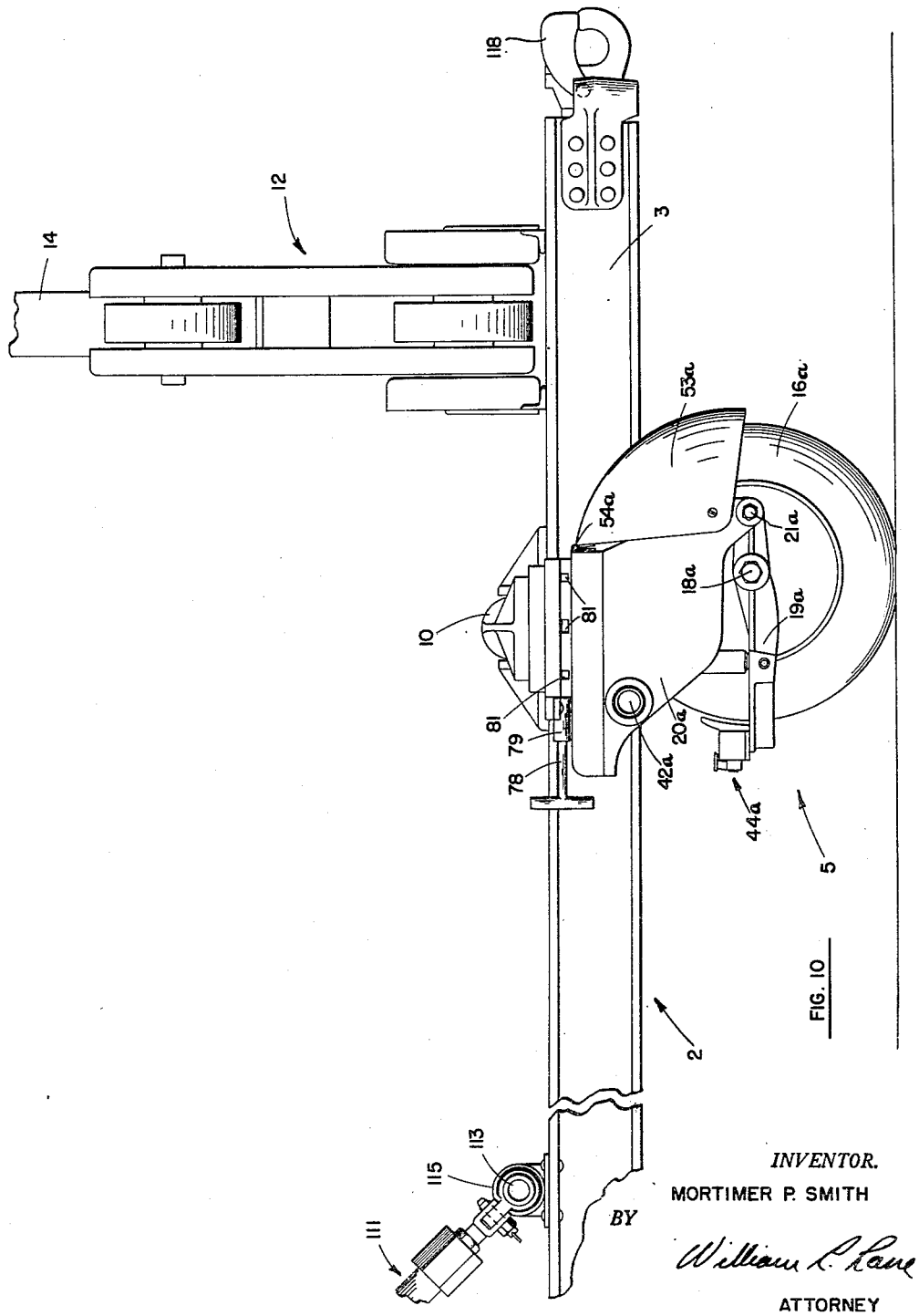

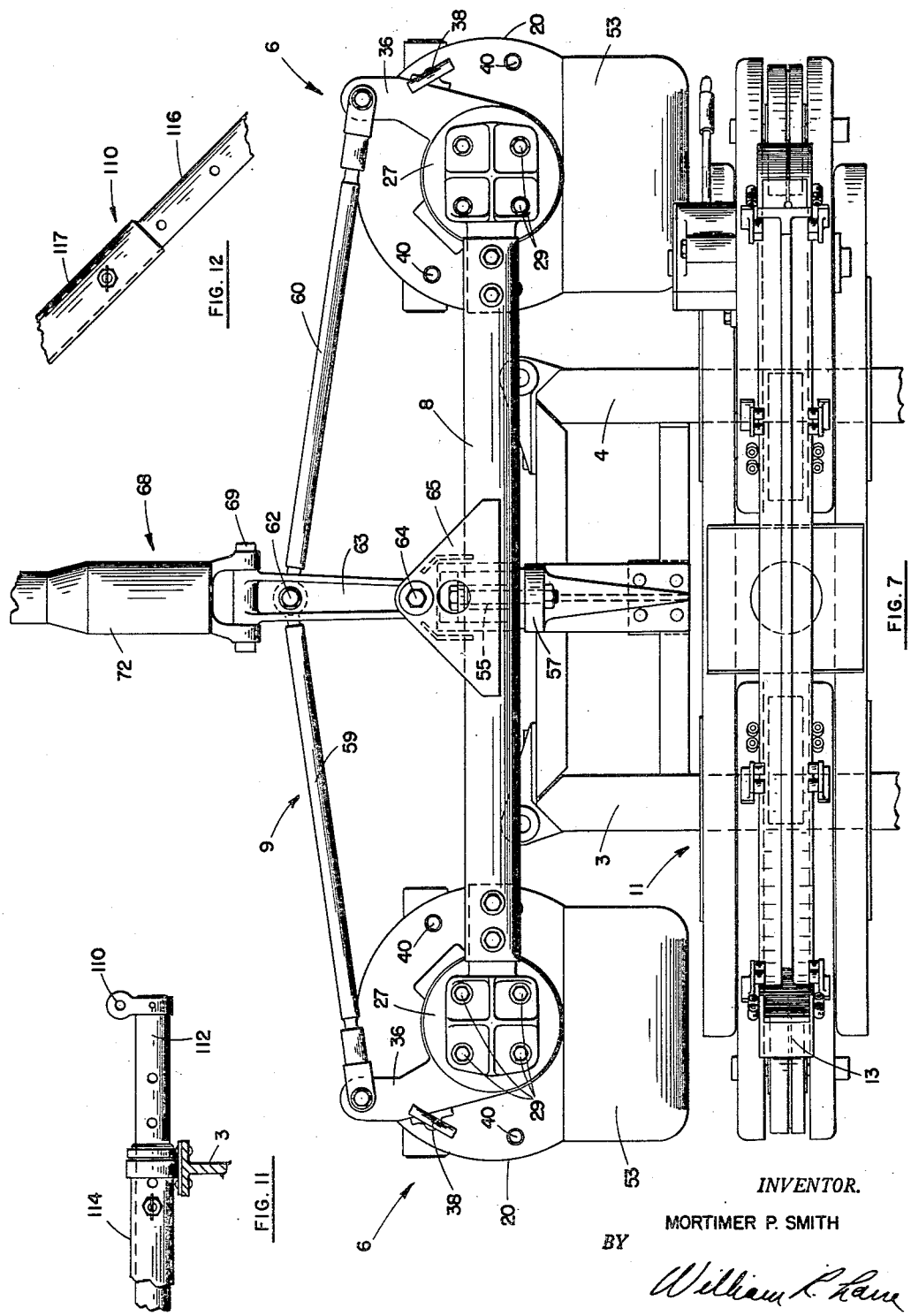

United States Patent Office 2,820,644
Patented Jan. 21, 1958

2,820,644

ENGINE TRAILER STEERING MEANS

Mortimer P. Smith, Los Angeles, Calif., assignor to North American Aviation, Inc.

Application July 16, 1954, Serial No. 443,859

4 Claims. (Cl. 280—103)

This invention pertains to an engine trailer and more particularly to an engine trailer adapted for high speed transportation of a jet propulsion engine, for being carried within another vehicle, or for supporting an engine for service.

The trailer of this invention is devised as an all-purpose unit to meet the usual field and shop needs for transporting and servicing a jet propulsion engine. First, it is of stable design with a low center of gravity whereby a loaded trailer can be safely towed at speeds of twenty miles per hour. Secondly, it is of light weight so that it can be readily transported by air. With this design most of the structural members may be of magnesium, yet engines of well over five thousand pounds can be accommodated. When the trailer of this invention is carried by another vehicle severe loading can be encountered without dislodging such an engine from the trailer. For aircraft transportation, crash landing loadings of eight times gravity fore and aft, as well as high vertical forces, can be expected and the trailer of this invention will safely hold an engine through such extreme conditions. Despite all of these features, an engine carried by the trailer of this invention is completely accessible for work by service personnel.

Accordingly, an object of this invention is to provide a trailer which is a stable yet light weight conveyance for an engine.

Another object of this invention is to provide a trailer which is adapted to withstand the loads normally imposed by conveyance of the engine and additionally from acceleration forces when the dolly is being transported by another vehicle.

Yet another object of this invention is to provide a trailer which is convenient to use and provides ready access to the engine components.

A still further object of this invention is to provide a trailer which has means for steering the wheels thereof.

These and other objects will become apparent from the following description taken in connection with the accompanying drawings in which Fig. 1 is a perspective view of the engine trailer of this invention;

Fig. 2 is a detail view of a front wheel assembly;

Fig. 3 is a top plan view of the arrangement of Fig. 2;

Fig. 7 is a top plan view of the front portion of the dolly;

Fig. 10 is an elevational view of the rear portion of the dolly;

Fig. 11 is a fragmentary detail view of the drag brace mounting arrangement, and Fig. 12 is a fragmentary detail view of the drag brace telescoping arrangement.

Figure 4:
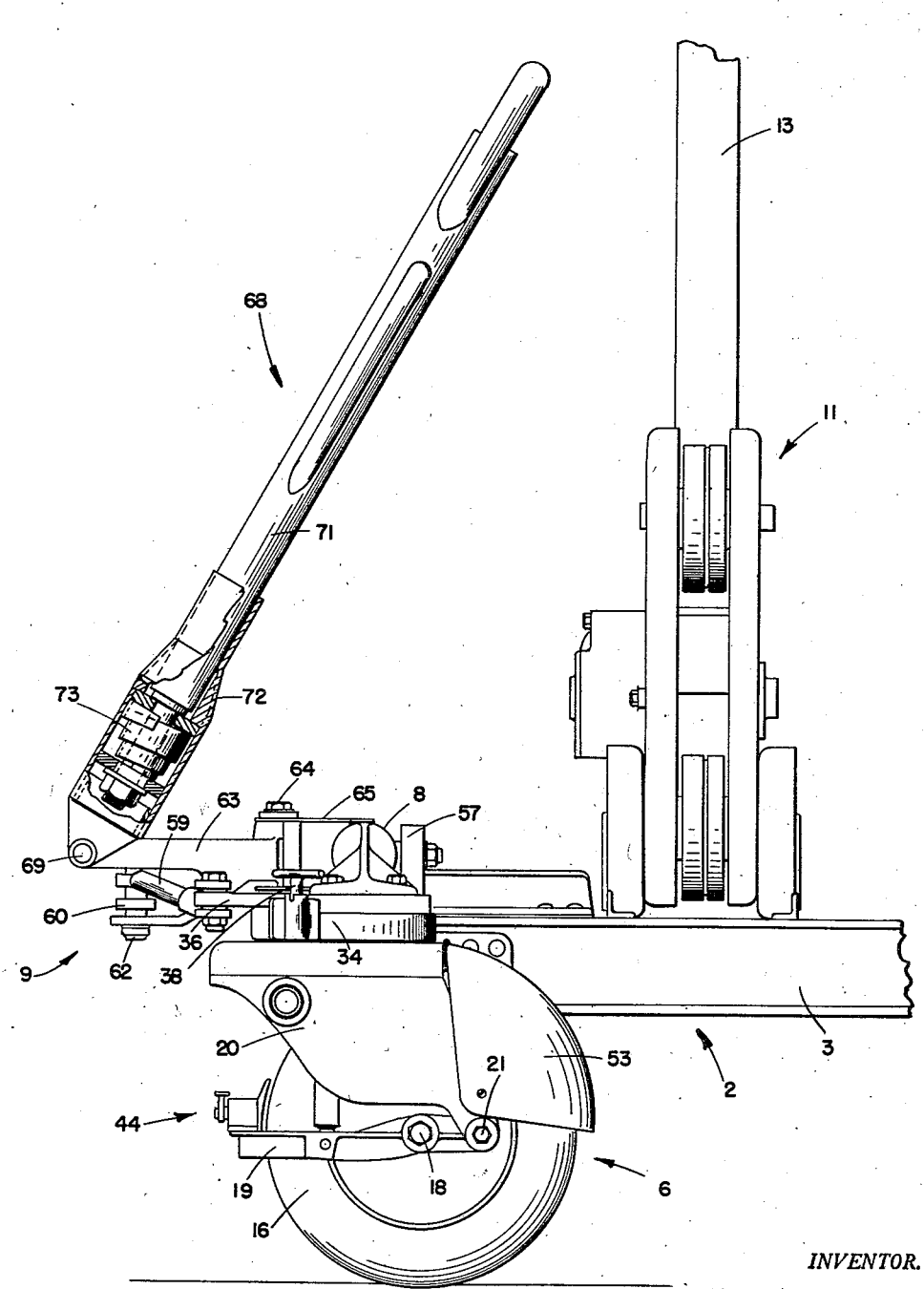
Fig. 4 is a side elevation of the front portion of the dolly with the tow bar in a raised position.

The engine trailer 1 of this invention is comprised of a frame 2 having closely spaced side rails 3 and 4, and supported by rear wheel assemblies 5 and front wheel assemblies 6. The latter wheel assemblies are connected to the frame through an axle 8 and interconnected by a steering mechanism 9, all of which will be made more clear hereinafter. Axle 10 engages the rear wheel assemblies and all of the wheel assemblies are of the caster type which can be swiveled relative to their axles. Also included with the trailer are roller assemblies 11 and 12 which carry arcuate engine supporting ring members 13 and 14, the latter members being adapted for attachment to a jet engine 15. Members 13 and 14 are pivotal transversely on the rollers so that in this manner the engine is pivotal relative to the trailer.

Referring now to the detailed construction of the various components and to their co-action in providing the dolly of this invention, the construction of the front wheel assemblies can be seen in Figs. 2 and 3. The right and left assemblies 6 are opposite hand, but otherwise identical. In order to withstand the loads applied on the trailer and also to economize on space and to provide the dolly with a low center of gravity, dual wheels 16 and 17 are employed. Each wheel moves about a hub 18 which connects it to a supporting yoke 19. Swivel 20 pivotally supports the yokes at 21. On the other side of hub 18 and on either side of the wheel the yoke engages a compression spring 23 which extends to the lower surface of upper plate 24 of swivel 20. Rod 25 on the inside of the spring acts as a guide. In this manner the wheels are individually sprung being free to move about pivot 21 in response to loads compressing spring 23.

The swivel connection of member 20 to the axle can best be seen by reference to Fig. 2. A support 27 is secured to the end of axle 8 by means of bolts 29. King pin 31 extends from member 27 to the swivel 20. A ball-bearing 32 is interposed between these two members absorbing the vertical loads therebetween. In this manner member 20 is permitted to swivel about king pin 31 as supported by bearing 32.

A flanged member 34 fits over the outside of support 27 and is rotatable about this member, being held in place vertically by cover plate 35. Member 34 includes a projecting steering arm 36 which is attached to the steering linkage, as will be brought out below. Pin 38 is vertically movable in a guide 39, the latter being integrally attached to steering arm 36, and the pin is adapted to fit in any one of a plurality of apertures 40 in upper portion 24 of member 20. With pin 38 in a raised position not received in an aperture 40, obviously member 20 is free to rotate relative to the steering arm. However, when pin 38 is lowered into an aperture 40 member 20 is locked and prevented from rotation relative to the steering linkage. One of apertures 40 is positioned whereby the wheels will be aligned in a forward direction with the steering mechanism in a neutral position.

A receptacle 42 in the side of member 20 is adapted to receive a rod or pipe to be used as a lever whereby the pivotal movement of the wheel assembly may be easily effected. If, when the wheel assemblies are locked to the steering linkage, the right and left wheel assemblies are towed in or towed out relative to each other, it will be impossible to move the dolly without sliding the wheels. At the same time the wheels may be unlocked and swiveled so as to permit individual steering thereof and provide complete maneuverability of the front of the dolly.

Figure 5:
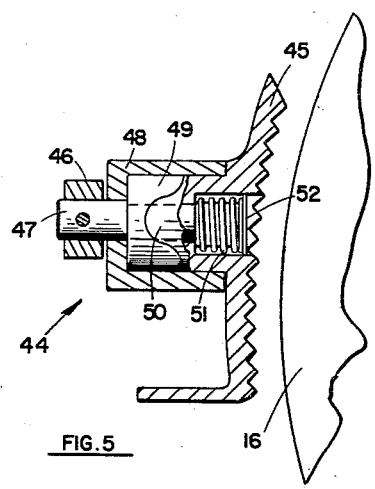
Fig. 5 is a fragmentary sectional view of the brake.

In addition, each of the wheel assemblies is provided with a brake 44. Shoe 45 is operated by foot lever 46 on pin 47 received in guide 48 as best seen in the fragmentary detail view of Fig. 5. Pin 47 carries a cam 49 on the end thereof, engaging in turn cam 50 on the end of the shoe. Movement of lever 46 rotates pin 47 thereby rotating the cams relative to each other. This forces the shoe into engagement with the wheel so that it serves as a brake and prevents rotation of the wheel. Spring 51 bears against washer 52 on pin 38 and the shoe to hold the shoe in a retracted position when lever 46 is up.

A mud guard 53 pivoted at 54 to the swivel member completes the elements of the wheel assembly.

Figure 6:
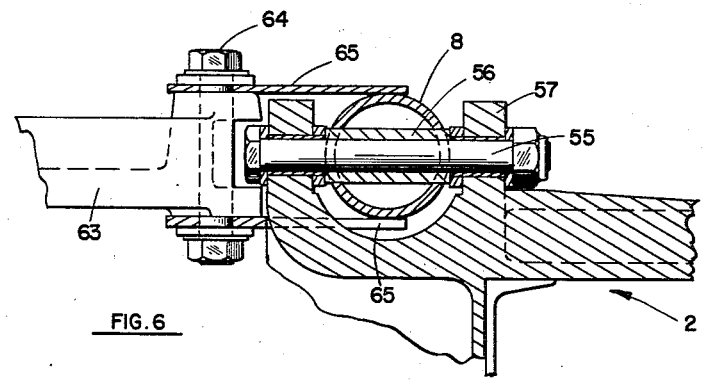
Fig. 6 is a fragmentary sectional view of the front axle mounting arrangement.

As best illustrated in the fragmentary sectional view of Fig. 6, front axle 8 is secured to the frame with freedom for transverse pivotal movement. This mounting is at the center of the axle where pin 55 in a suitable bearing 56 extends through the axle joining it to a U-shaped portion 57 of the frame. This pivotal connection of the front axle permits uniform load distribution even when the trailer is on rough and uneven terrain. Even more important, it prevents the imposition of torque loads on an engine carried by the dolly, which would otherwise occur from deflection of the frame. Nevertheless the stability of a four-wheel unit is obtained.

Steering mechanism 9 is best shown in Figs. 4, 6 and the plan view of Fig. 7. Tie rods 59 and 60 extend from steering arms 36 of the wheel assemblies and join at pin 62 to steering link 63. The latter member is in turn pivotally connected by pin 64 to the front axle by means of plates 65 which are attached to the axle. Obviously lateral movement of steering link 63 pivots this link about pin 64 and, through tie rods 59 and 60, causes lateral movement of steering arms 36 and pivots the front wheel assemblies. Simultaneous steering of the front wheel assemblies thereby results. Such steering is obtained by means of tow bar 68 connected to arm 63 at pin 69. In this manner the tow bar is connected through the front axle to the frame. Pin 69 permits the tow bar to be raised to the position of Fig. 4 when it is not in use. A towing means is thereby provided for the trailer which, at the same time, effects automatic steering thereof while the trailer is being towed. The tie rods include screw-type end fittings whereby their lengths can be adjusted and the front wheel assemblies aligned to provide proper steering and prevent shimmy.

In the preferred embodiment tow bar 68 is made up of two telescoping members 71 and 72 provided with a shock absorbing means 73 disposed therebetween (see Fig. 4). This arrangement absorbs suddenly applied loads between the dolly and the towing device smoothing out the towing operation and safeguarding the towing vehicle, the engine and the dolly itself. A volute spring, which has a non-linear load curve providing increasing resistance to higher loads, is particularly adaptable for use as the shock absorbing medium.

Figure 8:
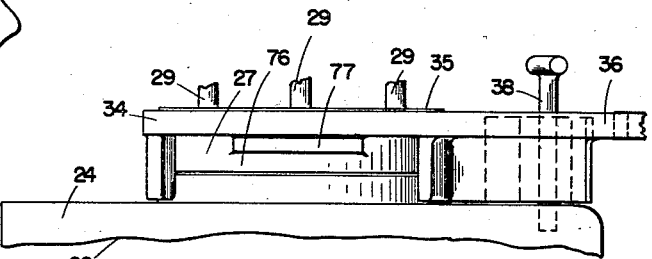
Fig. 8 is a detail view taken along line 8—8 of Fig. 3.

In order to limit the angle to which the wheel assemblies can be pivoted by means of the steering mechanism, a stop arrangement is provided as illustrated in detail in Fig. 8. This consists simply of an enlarged slot 76 in this side of member 34 which receives a lug 77 projecting from stationary support member 27, the lug being adapted to engage the edges of the slot to limit the angular travel of member 34. The stops are arranged so that with the steering arm at the limited positions, only tension loads will be applied to the tie rods, thus enabling the use of rods of minimum size.

Figure 9:
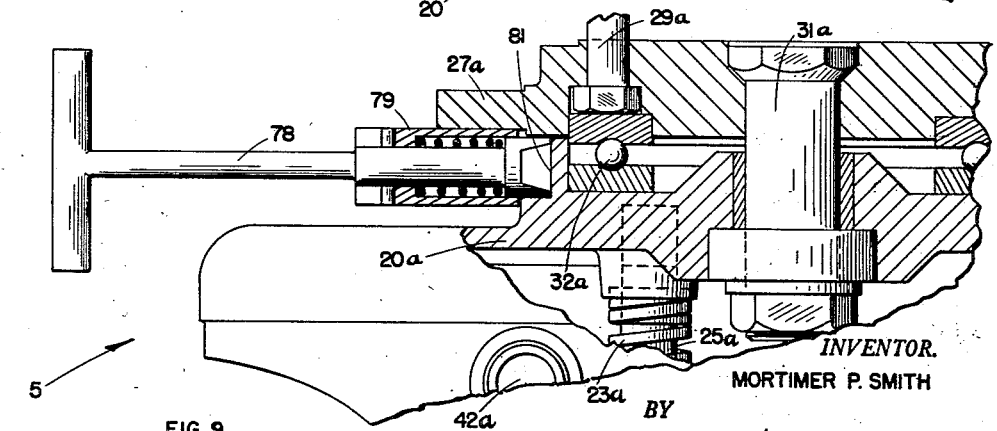
Fig. 9 is an enlarged detail view of a rear wheel assembly.

The rear wheel assemblies are substantially identical to the front wheel assemblies except, of course, there is no steering linkage interconnecting the two units. For that reason there is nothing equivalent to member 34 at the rear wheel assembly. Members of the rear wheel assemblies corresponding to those previously described for the front wheel assemblies have been given the suffix "a." The locking arrangement for preventing swiveling of member 20a differs slightly from that employed for the front wheel assemblies but is the same in principle. As shown in Fig. 9, a spring loaded plunger 78 is received within a guide 79 secured to member 27a, which is in turn fixed to the rear axle 10. The end of plunger 78 comprises a detent which is adapted to engage any of a plurality of openings 81 in member 20a and when in such engagement precludes rotation of member 20a (see Fig. 10).

The fact that the front and rear wheel assemblies are individually steerable means that the dolly is quite versatile and can be moved into almost any desired location. It would be possible, if so desired, to provide additional wheel assemblies at the axles but this is not regarded as necessary from the standpoint of simplicity, maximum stability requiring only four wheel assemblies.

A further provision on the dolly of this invention are drag braces 110 and 111, mounted in pairs on shafts 112 and 113, best seen in Figs. 1, 10, 11 and 12. Transverse tubes 114 and 115 rotatably connect shafts 112 and 113 to the frame, whereby the drag braces are pivotal and may be stowed adjacent the sides of the frame 2 when not in use, or pivoted to a raised position engaging the engine. These drag braces are made of a telescoping structure, as illustrated in Fig. 12, where it can be seen that brace 110 includes section 116 slidable into section 117 to vary the length of the brace. This facilitates stowage and permits use of a single brace for various engines. The drag braces provide a means for absorbing vertical and fore and aft loads on the engine directly into the frame rather than through the roller assemblies. This provides the resistance to crash loads when the trailer is being transported by airplane or other vehicle and assures that the engine will not be loosened from the trailer. At the rear of the frame a tow hitch 118 is provided whereby the dollies may be easily joined in a train towed by a single vehicle.

It can be seen by the foregoing description that I have provided an improved engine supporting trailer which offers compactness, economy, simplicity and dependability. The unit is of light weight construction so that it may be used for air transportation without an excessive weight penalty. Preferably the frame is made of magnesium or aluminum as well as most of the other components of the device. The design whereby the engine is supported at two laterally spaced roller assemblies simplifies use of the trailer and provides maximum access to the engine components when it is installed on the trailer. The primary components of the trailer are located very close to the ground which not only lowers the center of gravity of the unit but also facilitates access to the engine. The pivotal mounting of the front axle permits even load distribution on rough uneven terrain while retaining the stability of a four-wheel assembly unit and preventing torque loads on the engine. Steering is automatic when the unit is being towed while the individually steerable wheel assemblies permit maximum maneuverability for tight quarters and also can supplement the locking action of the brake units which are supplied for each of the wheel assemblies. The mounting of the engine on roller assemblies has an additional advantage in that it permits a floating relationship between the engine and its mounting medium whereby the engine is not subjected to appreciable stresses when it is being towed. Thus it may occur on uneven ground that the frame is distorted or deflected due to the loads imposed thereon. However, the engine through the medium of the roller assemblies and the ring support can float relative to the roller assembly and will not be twisted in the same manner as the frame. Further protection to the engine and smoother operation is provided by the shock absorbing means in the tow bar which absorbs lateral shock loads between the dolly and the towing device.

The foregoing detailed description is to be clearly understood as given by way of illustration and example only, the spirit and scope of this invention being limited only by the appended claims.

I claim:

1. An engine trailer comprising frame means; at least two rear wheel units; said rear wheel units being individually angularly positionable relative to said frame means, and including lock means for angularly fixing said units relative to said frame means; a front axle means connected to said frame means for transverse pivotal movement relative thereto; at least two front wheel units engaging said front axle means and angularly pivotal relative thereto; a steering assembly interconnecting said front wheel units for effecting angular positioning thereof, said front wheel units including lock means for angularly fixing said units relative to said front axle means; and brake means at each of said wheel units.

2. An engine trailer comprising a frame adapted to support an engine; at least two rear wheel units supporting said frame, said rear wheel units being individually angularly positionable relative to said frame; brake means at each of said rear wheel units; lock means for angularly fixing said rear wheel units relative to said frame; front axle means connected to said frame for transverse pivotal movement relative thereto; at least two front wheel units supporting said front axle means, said front wheel units being individually angularly positionable relative to said front axle means; brake means at each of said front wheel units; steering linkage interconnecting said front wheel units for effecting simultaneous angular positioning thereof relative to said front axle means; lock means for angularly fixing said front wheel units relative to said steering linkage; and a tow bar connected to said axle and said steering linkage for providing a means to tow said trailer and to effect automatic steering thereof during such towing, said tow bar including a shock absorber therein for absorbing shock loads during towing.

3. An engine trailer comprising a frame adapted to support an engine thereon; at least two rear wheel units supporting the rear portion of said frame; said rear wheel units being individually pivotally connected to said frame, and including lock means for angularly fixing said rear wheel units relative to said frame; a front axle; means connecting said front axle to said frame for transverse pivotal movement relative thereto; at least two front wheel units supporting said front axle, said front wheel units being individually pivotally connected to said front axle; a steering linkage operatively interconnecting said front wheel units, said front wheel units including lock means for angularly fixing said front wheel units relative to said steering linkage whereby when so fixed said linkage effects simultaneous angular positioning thereof relative to said axle; and a tow bar engaging said front axle and said steering linkage for providing a means to tow said trailer and to effect automatic steering thereof during such towing.

4. An engine trailer comprising a frame; at least four wheel assemblies including at least two front wheel assemblies and at least two rear wheel assemblies, each of said wheel assemblies including individually sprung wheel means for supporting said frame, swivel means interconnecting said rear wheel assemblies and said frame whereby said rear wheel assemblies are angularly positionable relative to said frame; lock means for fixing said rear wheel assemblies relative to said frame; front axle means connected to said frame for transverse pivotal movement relative thereto; swivel means interconnecting said front wheel assemblies and said front axle means whereby said front wheel assemblies are individually angularly positionable relative to said front axle means; lock means for fixing said front wheel assemblies relative to said front axle means; and steering means engaging said front wheel assembly, said steering means including towing means for permitting towing of said trailer, said towing means being operative to effect automatic steering of said front wheel assemblies during towing of said trailer.

References Cited in the file of this patent

UNITED STATES PATENTS

| | | |
|---|---|---|
| 1,175,312 | Simpson | Mar. 14, 1916 |
| 1,438,291 | Bennett | Dec. 12, 1922 |
| 2,107,384 | McQueen | Feb. 8, 1938 |
| 2,388,692 | House | Nov. 13, 1945 |
| 2,544,924 | Herold | Mar. 13, 1951 |
| 2,650,100 | Ronning | Aug. 25, 1953 |
| 2,674,445 | Diehl | Apr. 6, 1954 |
| 2,712,874 | Murray | July 12, 1955 |
| 2,727,637 | Weaver | Dec. 20, 1955 |
| 2,750,197 | Tripp | June 12, 1956 |